(12) United States Patent
Griffin et al.

(10) Patent No.: US 11,861,597 B1
(45) Date of Patent: \*Jan. 2, 2024

(54) DATABASE ENCRYPTION WALLET

(71) Applicant: Wells Fargo Bank, N.A., San Francisco, CA (US)

(72) Inventors: Phillip H. Griffin, Raleign, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,342

(22) Filed: Jun. 24, 2022

Related U.S. Application Data

(63) Continuation of application No. 16/239,308, filed on Jan. 3, 2019, now Pat. No. 11,373,172.

(51) Int. Cl.
*G06Q 20/36* (2012.01)
*H04L 9/08* (2006.01)

(52) U.S. Cl.
CPC ....... *G06Q 20/3678* (2013.01); *H04L 9/0822* (2013.01); *G06Q 2220/00* (2013.01)

(58) Field of Classification Search
CPC .. G06Q 20/00–425; G06Q 2220/00–18; H04L 9/00–50
See application file for complete search history.

(56) References Cited

U.S. PATENT DOCUMENTS

| 6,118,874 | A | 9/2000 | Okamoto et al. |
| 6,898,714 | B1 | 5/2005 | Nadalin et al. |
| 7,000,108 | B1 | 2/2006 | Yarsa et al. |
| 8,630,421 | B2 * | 1/2014 | Zheng .................. H04L 9/0894 380/284 |

(Continued)

OTHER PUBLICATIONS

Kaliski B., RFC 2898 PKCS #5: Password-Based Cryptography Specification Version 2.0, RSA Laboratories, Sep. 2000 (Year: 2000).*

(Continued)

*Primary Examiner* — John W Hayes
*Assistant Examiner* — Chenyuh Kuo
(74) *Attorney, Agent, or Firm* — Foley & Lardner LLP

(57) ABSTRACT

A method can include generating a cryptogram by encrypting, by a hardware security module (HSM), a keyed-hash message authentication code (HMAC) key by a master key encryption key (MK); transmitting, a database server, the cryptogram; destroying the cryptogram at the HSM, in response to the transmitting the cryptogram to the database server; receiving, from the database server, the cryptogram and an ID generated by the database server; generating a wallet password based on the ID and the cryptogram; generating a data encryption key (DK) retrievable via the wallet password; transmitting, to the database server, the DK without the wallet password; destroying the wallet password in response to the transmitting the DK to the database server; decrypting the cryptogram into a decrypted HMAC key; regenerating the wallet password using the ID and the decrypted HMAC key; encrypting the regenerated wallet password; transmitting, to the database server, the encrypted regenerated wallet password.

18 Claims, 3 Drawing Sheets

(56) References Cited

U.S. PATENT DOCUMENTS

| | | | |
|---|---|---|---|
| 2004/0205337 A1* | 10/2004 | Mao | H04L 9/302 |
| | | | 713/160 |
| 2006/0047625 A1* | 3/2006 | Ho | G06F 21/6227 |
| 2009/0106550 A1 | 4/2009 | Mohamed | |
| 2013/0024695 A1 | 1/2013 | Kandrasheu et al. | |
| 2013/0132721 A1 | 5/2013 | Busser et al. | |
| 2017/0099267 A1 | 4/2017 | Heit et al. | |
| 2017/0318412 A1 | 11/2017 | Schramm | |
| 2018/0144341 A1* | 5/2018 | Kärkkäinen | H04L 9/3263 |
| 2020/0065803 A1* | 2/2020 | Abouelenin | G06Q 20/36 |
| 2020/0106618 A1* | 4/2020 | Osborn | H04L 9/0863 |
| 2021/0273814 A1* | 9/2021 | Lee | H04L 9/0894 |
| | | | 380/284 |

OTHER PUBLICATIONS

Moriarty et al., IETF RFC 7292 PKCS #12: Personal Information Exchange Syntax V1.1, IETF, Jul. 2014 (Year: 2014).*
Aye et al. New Hybrid Signcryption Scheme with Digital Envelope, International Conference on Advances in Engineering and Technology (ICAET'2014), Mar. 29-30, Singapore (Year: 2014).*
Oracle, Oracle Database Enterprise User Security Administrator's Guide, 12c Release 1, Jun. 2017 (Year: 2017).*
Oracle, Oracle Database Enterprise User Security Administrator's Guide, 12c Release 1, Jun. 2017 (2017).

* cited by examiner

DATABASE ENCRYPTION WALLET

TECHNICAL FIELD

The present application relates generally to systems and methods for database encryption key management (DBEKM), including systems and methods for database encryption that use digital wallets (DBEW) to manage database encryption keys.

BACKGROUND

Database encryption technologies protect files, tables, columns, rows, or individual cells within a database. Sensitive information (e.g., credit card numbers, social security numbers and other sensitive or personally identifiable information) is encrypted to prevent access by unauthorized entities. Data encryption is typically performed using cryptographic software modules. Digital wallets are secure files used to store and transport private information, such as private keys, usernames, database encryption keys, etc. The digital wallet can be associated with a wallet password that can lock and unlock the wallet so the secured information can be retrieved or secured. The wallet password is then obfuscated or hidden to control access to the information stored within the digital wallet.

SUMMARY

A first embodiment relates to a method performed by a processor of a database encryption wallet (DBEW) system. The method can include generating a cryptogram by encrypting, by a hardware security module (HSM), a keyed-hash message authentication code (HMAC) key by a master key encryption key (MK). The method can include transmitting, by the HSM to a database server, the cryptogram. The method can include destroying, by the HSM, the cryptogram at the HSM, in response to the transmitting the cryptogram to the database server. The method can include receiving, by the HSM from the database server, the cryptogram and an identifier (ID) generated by the database server. The method can include generating, by the HSM, a wallet password based on the ID and the received cryptogram. The method can include generating, by the HSM, a data encryption key (DK) retrievable only via the wallet password. The method can include transmitting, by the HSM to the database server, the DK without the wallet password. The method can include destroying, by the HSM, the wallet password in response to the transmitting the DK to the database server. The method can include decrypting, by the HSM, the cryptogram into a decrypted HMAC key. The method can include regenerating, by the HSM, the wallet password using the ID and the decrypted HMAC key. The method can include encrypting, by the HSM, the regenerated wallet password. The method can include transmitting, by the HSM to the database server, the encrypted regenerated wallet password. The database server can decrypt the encrypted regenerated wallet password, and retrieve the DK using the decrypted regenerated wallet password.

A second embodiment relates to a system. The system can include a hardware security module (HSM). The HSM can generate a cryptogram by encrypting a keyed-hash message authentication code (HMAC) key by a master key encryption key (MK). The HSM can transmit, to a database server, the cryptogram. The HSM can destroy the cryptogram at the HSM, in response to the transmitting the cryptogram to the database server. The HSM can receive, from the database server, the cryptogram and an identifier (ID) generated by the database server. The HSM can generate a wallet password based on the ID and the received cryptogram. The HSM can generate a data encryption key (DK) retrievable only via the wallet password. The HSM can transmit, to the database server, the DK without the wallet password. The HSM can destroy the wallet password in response to the transmitting the DK to the database server. The HSM can decrypt the cryptogram into a decrypted HMAC key. The HSM can regenerate the wallet password using the ID and the decrypted HMAC key. The HSM can encrypt the regenerated wallet password. The HSM can transmit, to the database server, the encrypted regenerated wallet password. The database server can decrypt the encrypted regenerated wallet password. The database server can retrieve the DK using the decrypted regenerated wallet password.

Another embodiment relates to a method performed by a processor of a database server of a database encryption wallet (DBEW) system. The method can include generating, by a database server including a data encryption key (DK) and locked with a wallet password, a password request message including a cryptogram generated by a hardware security module (HSM) and an identifier (ID) generated by the database server, the cryptogram generated by encrypting, by the HSM, a keyed-hash message authentication code (HMAC) key by a master key encryption key (MK). The method can include encrypting, by the database server, the password request message. The method can include transmitting, by the database server, the password request message to the HSM over a secure connection. The method can include receiving, by the database server, an encrypted regenerated wallet password from the HSM. The method can include verifying, by the database server, a digital signature of the encrypted regenerated wallet password. The method can include generating, by the database server, a regenerated wallet password by decrypting, by the database server, the encrypted regenerated wallet password. The method can include unlocking, by the database server, the digital wallet using the regenerated wallet password. The HSM can receive the password request message, verify the digital signature of the password request message, decrypt the password request message, regenerate the wallet password based on the secret key element and the ID, digitally sign and encrypt the regenerated wallet password, and transmit the digitally signed and encrypted wallet password to the database server.

These and other features, together with the organization and manner of operation thereof, will become apparent from the following detailed description when taken in conjunction with the accompanying drawings, wherein like elements have like numerals throughout the several drawings described below.

Figure 1:
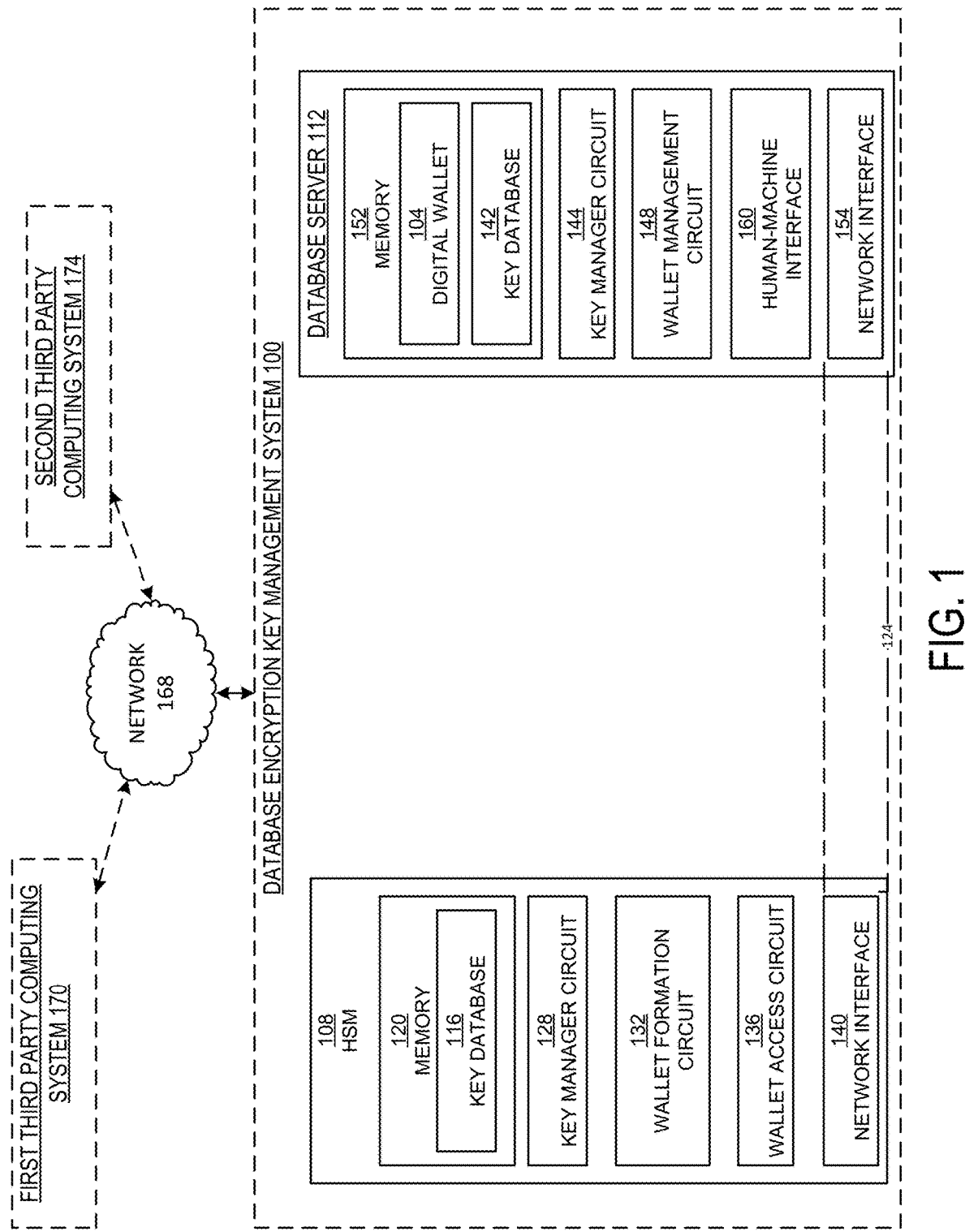
FIG. 1 is an environmental view of a database encryption key management system for securely storing and transporting a random data encryption key (DK) using a digital wallet, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Database encryption can be done using cryptographic software modules on the database servers. Consequently, data encryption keys (DKs) are kept in the database system memory and used with cryptographic software to encrypt and decrypt data. For secure key management reasons, the DK cannot not be stored as cleartext, which is easily compromised. A DK may itself be encrypted using a key encryption key (KEK). However, encrypting the DK with another key for local storage does not address the key management issue as the KEK must likewise be stored as cleartext somewhere. A hardware security module (HSM) can be used to avoid this circular problem.

In some systems, an HSM is used with a KEK, which can include symmetric or asymmetric keys. The DK is encrypted using the KEK, stored externally outside the HSM, and decrypted using the KEK within the HSM. However, exposing the DK as cleartext outside the HSM violates a fundamental principle of cryptographic control: an HSM cannot knowingly export cleartext keys. Conventionally, this control is often averted by treating the DK as a data element and spoofing the HSM as encrypting and decrypting data instead of an actual cryptographic key.

In some systems, the DKs can be transported according to a transfer syntax described by the Internet Engineering Task Force (IETF) RFC 7292 Password-Based Cryptography Standard (PKCS #12): Personal Information Exchange Syntax v1.1 ("PKCS #12"). For example, the DK can be encrypted using a KEK that is derived from a password. However, the password now needs to be protected to prevent the password from being compromised and used to gain unauthorized access to the DK.

In some solutions, a Key Management Interoperability Protocol (KMIP) can be used to transmit DKs over a secure connection, such as a TLS connection, that transmits data packets that are encrypted using TLS session keys. The KMIP allows both wrapped and unwrapped keys. "Wrapped keys" refer to DKs that are encrypted with both a KEK and the TLS connection. The KEK can be a dedicated KEK for the DK and can be specific to an intended recipient or group of recipients. "Unwrapped keys" refer to cleartext DKs that are encrypted with the TLS connection. Unwrapped keys are not protected with dedicated KEKs. Accordingly, any entity having the TLS session key can see the cleartext of any unwrapped keys. Furthermore, the cleartext DK is exposed wherever the TLS tunnel terminates, making the cleartext DK vulnerable.

Referring to the figures generally, various embodiments described herein relate to systems and methods for securely storing and transporting a DK using a digital wallet using a database encryption wallet (DBEW) system. According to various embodiments, a hardware security module (HSM) generates a master encryption key (MK) and a keyed-hash message authentication code (HMAC) key. The HSM encrypts the HMAC key with the MK to create a secret key element and sends the secret key element to a database server over a secure connection. The database server saves the secret key element to its memory and generates an identifier (ID) corresponding to the encrypted HMAC key. The HSM deletes the HMAC key, the encrypted HMAC key, and stores the MK to its memory. The HSM generates a wallet password based on the ID generated by the database server and the HMAC key generated by the HSM. The HSM generates the digital wallet, stores a random data encryption key (DK) in the digital wallet, and locks the digital wallet using the wallet password. The digital wallet includes the DK and is unlockable only via the wallet password. The DK is stored as PKCS #12 or similar encrypted content. The password is used via PKCS #5 Password-Based Key Derivation Function 2 (PBKDF2) or a similar function to generate a content encryption key (CEK) that is used to decrypt the DK. The HSM transmits the digital wallet to the database server without the wallet password. The database server saves the digital wallet to its memory. Accordingly, interception of the digital wallet by an unauthorized entity during transmission does not compromise the DK because the wallet password is not included in the transmission. The HSM then destroys the wallet password and the HMAC key.

Each time the digital wallet is unlocked, the database server transmits a digitally signed password request message including the ID and the secret key element to the HSM. The HSM uses the MK to decrypt the secret key element to obtain the HMAC key. The HSM regenerates the wallet password using the ID and the HMAC key. The HSM digitally signs and encrypts the regenerated wallet password and transmits the digitally signed and encrypted wallet password to the database server. The database server verifies the digital signature and decrypts the encrypted regenerated wallet password. The database server unlocks the digital wallet using the regenerated wallet password and retrieves the DK. The database server stores the DK in non-volatile memory such that the database server, after a system restart, must transmit a second password request message to receive the regenerated wallet password.

Referring now to FIG. 1, an environmental view of a database encryption key management system 100 for securely storing and transporting a database encryption key (DK) using a digital wallet 104 is shown, according to an example embodiment. The digital wallet 104 refers to a secure file that can securely store and transport private information, for example according to a PKCS #12 protocol. The system 100 includes a hardware security module (HSM) 108 and a database server 112. The database encryption key management system 100 is structured so that the HSM 108 manages DKs generated by the HSM 108 without exporting cleartext keys. Exporting cleartext keys is a violation of a core tenet of cryptographic key management. According to various example embodiments, as described in further detail both herein and in U.S. co-pending U.S. patent application Ser. No. 15/811,789, the entirety of which is hereby incorporated by reference herein, systems and methods described herein provide a technical solution to the computer-centric and internet-centric problem of encrypting data for local storage with the use of an HSM without having to transmit cleartext keys between the HSM and the database server.

According to various embodiments, the HSM 108 generates a master key encryption key (MK) and an HMAC key, which are never transmitted outside the HSM 108. The MK and the HMAC key are symmetric keys. The MK may be stored in a key database 116 of a memory device 120 of the HSM 108. The HSM 108 encrypts the HMAC key using the MK to generate an HMAC cryptogram or secret key element, which is transmitted to the database server 112. The database server 112 generates a unique identifier (ID) 136 and stores the HMAC cryptogram and the ID in the memory device 152. The HSM 108 then destroys the HMAC key and the HMAC cryptogram. The HSM 108 generates a digital wallet 104. As used herein, the phrase "digital wallet" refers to a secure archive file that can be used to securely store and transport data, such as encryption keys. In some embodiments, the digital wallet 104 may be a PKCS #12 wallet. The HSM 108 generates a cleartext DK and stores the cleartext DK in the digital wallet 104. In other embodiments, the DK may be encrypted or obfuscated before the DK is stored in the digital wallet 104. In order to generate a wallet password to lock the digital wallet 104, the database server 112 transmits the HMAC cryptogram and the ID to the HSM 108. The HSM 108 generates a seed using the HMAC key and the ID. In some embodiments, the HSM 108 can generate a salt, attach the salt to the seed to generate a salted seed, and conduct a one-way hash function on the salted seed. In some embodiments, the wallet password can be the seed. In some embodiments, the wallet password can be the output of the one-way hash function of the salted seed can be the wallet password. The HSM 108 locks the digital wallet 104 with the wallet password. The HSM 108 then destroys the wallet password. The HSM 108 transmits the locked digital wallet 104 back to the database server 112. The database server 112 saves the locked digital wallet 104 to its disk memory.

In order to unlock the digital wallet 104 to access the cleartext DK stored in the digital wallet 104, the database server 112 transmits a password request message to the HSM 108. The password request message includes the cryptogram and the ID. In some embodiments, the database server 112 digitally signs and encrypts the password request message. In other embodiments, the database server 112 signcrypts the password request message. The HSM 108 can verify the digital signature of the password request message and decrypt the password request message. The HSM 108 decrypts the cryptogram using the MK to regenerate the HMAC key. The HSM 108 then regenerates the wallet password based on the HMAC key and the ID. The HSM 108 then digitally signs and encrypts or signcrypts the wallet password and transmits the regenerated wallet password to the database server 112 over a secure connection 124. The database server 112 receives the regenerated wallet password, verifies the digital signature of the regenerated wallet password decrypts the wallet password, and uses the regenerated wallet password to unlock the digital wallet 104. The database server 112 then reads the cleartext DK into the volatile memory. The database server 112 can then use the DK to encrypt and/or decrypt data. The cleartext DK is never written to memory device 152 of the database server 112. Accordingly, the database encryption key management system 100 enables secure transfer and storage of database encryption key without transmitting cleartext keys.

As shown in FIG. 1, the example configuration including the database encryption key management system 100 may be used to secure the content of a database on the database server 112 such that vulnerability of the database to external attacks, and the likelihood that the data stored therein would be compromised, are minimized. Additionally, in some embodiments, a first third-party computing system 170, a second third-party computing system 174 may be in operative communication with the database encryption key management system 100 and/or each other via a network 168. The network 168 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

Multiple parties, such as users of the first third-party computing system 170 and the second third-party computing system 174, submit requests for encrypted data, which they receive via the network 168. The database server 112 may house a conventional data processing system, such as a database management system (DBMS) or a suitable alternative arrangement, including distributed arrangements and arrangements that are entirely software-based and where a conventional DBMS is omitted.

In the embodiment illustrated in FIG. 1, the database encryption key management system 100 includes the HSM 108 and the database server 112. The HSM 108 is structured to host the digital keys generated by the key manager circuit 128, including at least one master key encryption key (MK), at least one HMAC key, and at least one cryptogram. The HSM 108 includes the memory device 120 (e.g., a memory and/or a permanent storage module), in which the MK is stored and any other keys (e.g., keys used for secure communication protocols) can be stored.

The database server 112 is communicatively coupled to the HSM 108 via a secure connection 124. In some embodiments, the secure connection 124 is a Transport Layer Security (TLS) protocol-based electronic connection. In other embodiments, the secure connection 124 is an Internet Protocol Security (IPsec)-based connection. Additionally or alternatively, the secure connection 124 may be established using cryptographic message syntax (CMS)-based key transport or key agreement schemes as described, for example, in the X9.73:2017 Cryptographic Message Syntax (CMS)—ASN.1 and XML protocol. As used herein, the phrase "encrypted" means encrypted according the X9.73: 2017 CMS protocol. Additionally or alternatively, the secure connection 124 may be established using a mutual authentication algorithm comprising digital certificates. After the secure connection 124 is established, the HSM 108 transmits at least the HMAC cryptogram to the database server 112. The database server 112 may reside at least in part on a mobile device, such that a public encryption key is securely distributed to the mobile device, and/or on an internet-of-things (IoT) device, such that that a public encryption key is securely distributed to the IoT device.

The HSM 108 includes a key manager circuit 128, a wallet formation circuit 132, a wallet access circuit 136, the memory device 120, and a network interface 140. The memory device 120 is a disk or other non-volatile memory device. The memory device 120 includes the key database 116. The network interface 140 is structured to facilitate operative communication between the database server 112 and other networked computing systems, such as the first third-party computing system 170 and the second third-party computing system 174 via the network 168.

The key manager circuit 128 is structured to generate and manage various cryptographic keys stored in the key database 116 and to encrypt data elements using the cryptographic keys. In the illustrated embodiment, the key manager circuit 128 may be structured to generate a public/private key pair and save the public/private key pair to the memory device 120. The key manager circuit 128 may be structured to generate X.509 certificates for sharing the public key and an identity of the HSM 108 with other computing devices on the network 168. In some embodiments, the key manager circuit 128 is structured to generate at least one master key encryption key (MK) and at least one keyed-hash message authentication code (HMAC) key. The key manager circuit 128 is structured to encrypt the HMAC key with the MK to generate a cryptogram or secret key element. The key manager circuit 128 is structured to digitally sign the cryptogram. The key manager circuit 128 is structured to transmit the cryptogram to the database server 112 over a secure connection 124. The key manager circuit 128 is structured to save the MK to the key database 116 in the memory device 120. The key manager circuit 128 is structured to erase the HMAC key and the cryptogram. The HMAC key and the cryptogram are never written to disk memory, cache memory, or any other non-volatile memory.

The wallet formation circuit 132 is structured to generate the DK, the wallet password, and the digital wallet 104. The wallet formation circuit 132 is structured to generate the DK. In some embodiments, the wallet formation circuit 132 may generate the DK using a key derivation algorithm such as a secure hash algorithm (SHA) 256, FIPS 180-4, etc. The wallet formation circuit 132 is structured to receive the cryptogram and the ID from the database server 112. The wallet formation circuit 132 is structured to verify a digital signature of the cryptogram and the ID. The wallet formation circuit 132 is structured to decrypt the cryptogram using the MK to generate the HMAC key. The wallet formation circuit 132 is structured input the HMAC key and the ID into a pseudorandom function generator to generate the seed. In some embodiments, the wallet formation circuit 132 is structured to generate the seed according to a HMAC mechanism, such as a SHA-1, SHA-224, SHA-256, SHA-384, SHA-512, SHA-512/224, or SHA-512/256 mechanism as described in FIPS 180-4. In some embodiments, the wallet formation circuit 132 may generate a salt and append the salt to the seed to generate a salted seed. The wallet formation circuit 132 may conduct a one-way hash function on the salted seed. In some embodiments, a pepper may be used instead of or in addition to a salt. In some embodiments, the seed is the wallet password. In other embodiments, the output of the one-way hash function on the salted seed is the wallet password.

The wallet formation circuit 132 is structured to generate the digital wallet 104 with the DK and the wallet password. The wallet formation circuit 132 may generate the digital wallet 104 according to the PKCS #12 protocol. The wallet formation circuit 132 is structured to store the DK in the digital wallet 104. In the illustrated embodiment, the DK is stored as a cleartext DK in the digital wallet 104. In other embodiments, the DK may be encrypted or obfuscated in some manner before the DK is stored in the digital wallet 104. The wallet formation circuit 132 is structured to lock the digital wallet 104 using the wallet password such that the digital wallet 104 can only be unlocked using the wallet password. In some embodiments, the wallet formation circuit 132 may use the wallet password to lock the digital wallet 104 in accordance with the PKCS #5 v2.1: Password-Based Cryptography Standard. The DK is stored as PKCS #12 encrypted content. The password is used via PKCS #5 PBKDF2 to generate a content encryption key (CEK) that is used to decrypt the DK. In some embodiments, the wallet formation circuit 132 can be structured to sign the digital wallet 104 using the private key of the HSM 108 to create a digital signature for the digital wallet 104. The wallet formation circuit 132 is structured to transmit the locked digital wallet 104 to the database server 112. The wallet password is not sent with the digital wallet 104. This prevents any unauthorized entity that has intercepted the digital wallet 104 from being able to unlock the digital wallet 104 to access the DK. The wallet formation circuit 132 is structured to erase the DK, the cryptogram, the seed, and the salt from the memory. The DK, the cryptogram, the seed, and the salt are never written to disk memory, cache memory, or any other non-volatile memory.

After the digital wallet 104 has been installed in the database server 112, the wallet access circuit 136 is structured to receive a digitally signed and encrypted password request message including the cryptogram and the ID from the database server 112. The wallet access circuit 136 is structured to verify the digital signature of the password request message and decrypt the password request message. The wallet access circuit 136 is structured to decrypt the cryptogram using the MK to regenerate the HMAC key. The wallet access circuit 136 is structured input the HMAC key and the ID into a pseudorandom function generator to regenerate the seed. In some embodiments, the wallet access circuit 136 may generate a salt and add the salt to the seed to generate a salted seed. The wallet access circuit 136 may conduct a one-way hash function on the salted seed. In some embodiments, the seed is the wallet password. In other embodiments, output of the one-way hash of the seed and the salt is the wallet password. In some embodiments, the wallet access circuit 136 can be structured to digitally sign and encrypt the wallet password. In some embodiments, the wallet access circuit 136 can be structured to signcrypt the wallet password. The wallet access circuit 136 is structured to transmit the digitally signed and encrypted wallet password or the signcrypted wallet password to the database server 112 over the secure connection 124. The wallet access circuit 136 is structured to erase the cryptogram, the seed, and the salt from the memory. The cryptogram, the seed, and the salt are never written to disk memory, cache memory, or any other non-volatile memory.

In some embodiments, the wallet access circuit 136 is structured to generate a set of wallet password substitution strings. The wallet password substitution strings can each replace a portion of the wallet password (e.g., the seed or the salted seed) to generate a substitute wallet password. In such embodiments, the wallet access circuit 136 can send the wallet password substitution strings to the database server 112 over the secure network. The database server 112 can modify the digital wallet 104 such that the digital wallet 104 can be opened by the substitute wallet password instead of the wallet password, as described in greater detail below. In response to receiving a confirmation message from the database server 112 indicating successful modification of the digital wallet 104, the wallet access circuit 136 is structured to generate the wallet password as described above. The wallet access circuit 136 is then structured to substitute the wallet password with the substitution strings to generate the substitute wallet password. The wallet access circuit 136 is structured to digitally sign and encrypt or signcrypt the substituted wallet password. The wallet access circuit 136 is structured to transmit the digitally signed and encrypted or signcrypted substitute wallet password to the database server 112 as described above with respect to the wallet password. In some embodiments, the substitute wallet password can be a one-time use password. In such an embodiment, new substitution strings are generated each time the digital wallet 104 is opened.

The database server 112 includes a key manager circuit 144, a wallet management circuit 148, a memory device 152, and a network interface 154. The memory device 152 is a disk or other non-volatile memory device. The network interface 154 can be used to communicate with devices connected to the network 168, such as the third-party computing systems 170, 174.

The key manager circuit 144 is structured to generate and manage various cryptographic keys, and to encrypt data elements using the cryptographic keys. The key manager circuit 144 may be structured to generate a public/private key pair and save the public/private key pair to the memory device 152. The key manager circuit 144 may be structured to generate X.509 certificates for sharing the public key and an identity of the database server 112 with other computing devices on the network 168.

The database server 112 is structured to receive the cryptogram from the HSM 108 over the secure connection. In embodiments in which the cryptogram is digitally signed, the key manager circuit 144 is structured to verify the digital signature of the cryptogram. After verifying the digital signature of the cryptogram, the key manager circuit 144 is structured to save the cryptogram to the memory device 152. The key manager circuit 144 is structured to generate and store the ID that corresponds to the cryptogram provided by the HSM 108. The purpose of the ID is to uniquely identify to the database server 112 to the HSM 108. In some embodiments, the ID comprises an ordered list of database server attributes. The database server attributes may include database properties: for example, a host name, a geographic location indicator, a database server identifier, a database application name (e.g., in embodiments where a database application generates the ID), a string identifying a database encryption algorithm used in the transaction, and/or a string identifying a data element in the database.

The database server 112 is structured to receive the digital wallet 104 from the HSM 108 over the secure connection. The wallet management circuit 148 is structured to verify the digital signature of the digital wallet 104. In embodiments in which digital wallet 104 is encrypted, the wallet management circuit 148 is structured to decrypt the digital wallet 104. The wallet management circuit 148 is structured to save the digital wallet 104 to the memory device 152 of the database server 112. The memory device 152 includes the digital wallet 104 and a key database 156. Although the digital wallet 104 includes the cleartext DK, the database server 112 cannot access the cleartext DK because the wallet password is not sent with the digital wallet 104 or stored in the key database 156 of the memory device 152 of the database server 112.

To access the DK, the wallet management circuit 148 is structured to generate a password request message including the cryptogram and the ID. In some embodiments, the wallet management circuit 148 is structured to digitally sign and encrypt the password request message. In some embodiments, the wallet management circuit 148 is structured to signcrypt the password request message. The wallet management circuit 148 is structured to transmit the password request message to the HSM 108 over the secure connection 124.

The database server 112 is structured to receive the digitally signed and encrypted wallet password from the HSM 108. The wallet management circuit 148 is structured to verify the digital signature of the wallet password. The wallet management circuit 148 is structured to decrypt the wallet password. The wallet management circuit 148 is structured to unlock the digital wallet 104 with the wallet password to reveal the cleartext DK. The database server 112 is structured to encrypt and decrypt data using the DK. The wallet password and the DK are never written to disk memory, cache memory, or any other non-volatile memory. Therefore, the wallet password and the DK are erased when the database server 112 is restarted or powered off. Accordingly, the wallet management circuit 148 can unlock the digital wallet 104 using the wallet password to access the cleartext DK without requiring human entry of the wallet password.

In embodiments in which the substitute wallet password is used, the database server 112 is structured to receive the digitally signed and encrypted or signcrypted substitution strings from the HSM 108. The wallet management circuit 148 is structured to verify the digital signature of the substitution strings. The wallet management circuit 148 is structured to decrypt the substitution strings. The wallet management circuit 148 is structured to modify the digital wallet 104 based on the substitution strings such that the digital wallet 104 can be opened by the substitute wallet password. The wallet management circuit 148 is structured to send a confirmation message to the HSM 108 indicating successful modification of the digital wallet 104. To open the digital wallet 104, the wallet management circuit 148 is structured to receive the digitally signed and encrypted substitute wallet password from the HSM 108. The wallet management circuit 148 is structured to verify the digital signature of the substitute wallet password, decrypt the substitute wallet password, and open the digital wallet 104 using the substitute wallet password as described above with respect to the wallet password.

In some embodiments, multiple DKs may be used in a key management structure by, for example, using multiple digital wallets 104 to store each of the DKs and securing each of digital wallets 104 with a unique wallet password.

Figure 2:
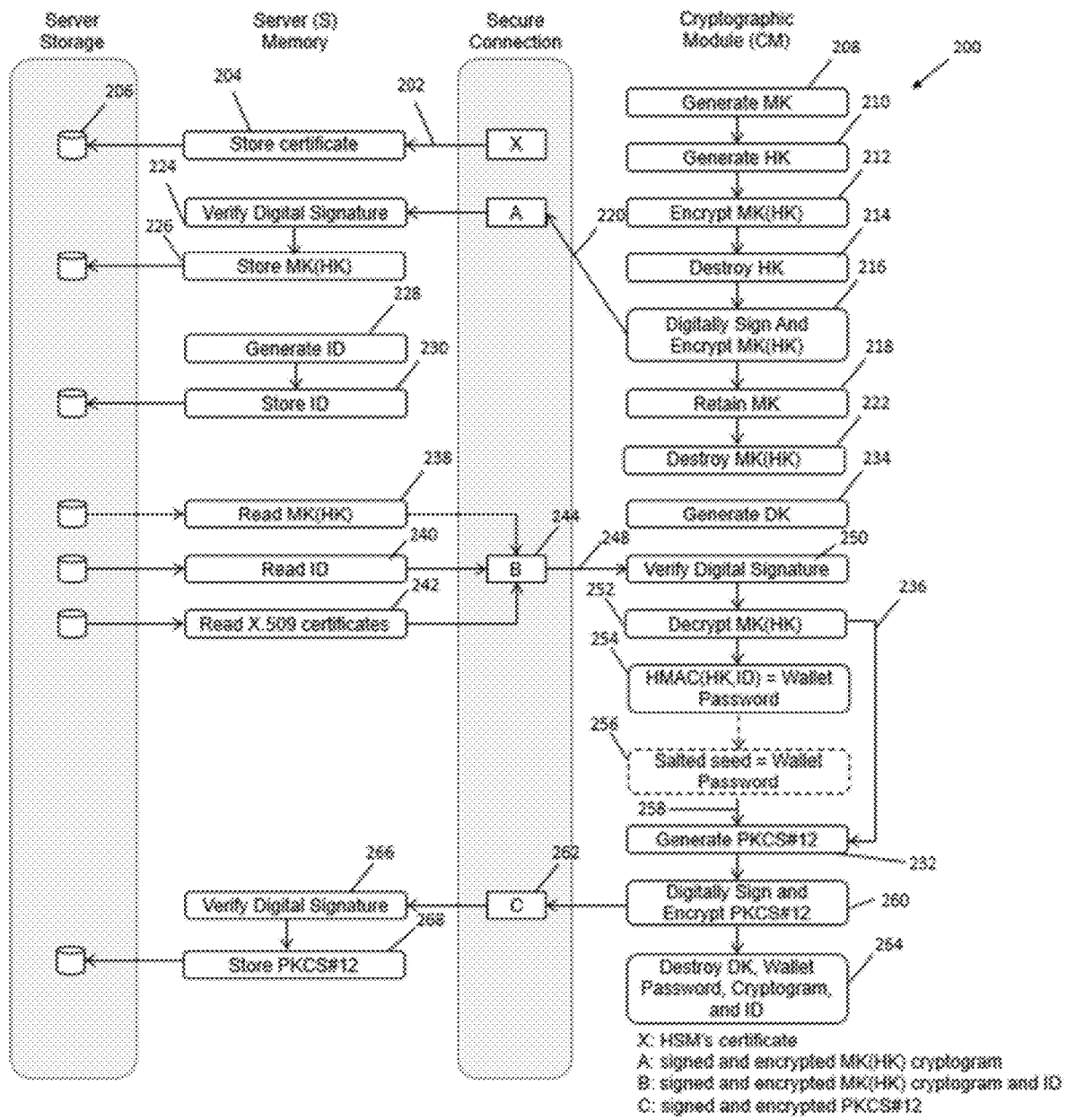
FIG. 2 is a schematic flow diagram of a method of creating a digital wallet without transmitting cleartext DKs is shown, according to an example embodiment.

Referring now to FIG. 2, a method 200 of creating a digital wallet 104 without transmitting cleartext DKs is shown, according to an example embodiment. At step 202, the HSM 108 establishes the secure connection 124 with the database server 112. At step 204, the HSM 108 transmits its certificate to the database server 112 by the key manager circuit 128. In other embodiments, the HSM 108 and the database server 112 exchange certificates by the key manager circuits 128, 144, respectively. At step 206, the database server 112 stores the certificate to the memory device 120. At step 208, the MK is generated by the key manager circuit 128.

At step 210, the HMAC key is generated by the key manager circuit 128. The purpose of the HMAC key is to further secure the message(s) exchanged by the key manager circuit 128 and the database server 112 across the secure connection 124 by verifying the data integrity and origin authenticity of each message. At step 212, the cryptogram is generated by the key manager circuit 128 by encrypting the HMAC key with the MK. At step 214, the HMAC key is destroyed to avoid security vulnerabilities associated with permanently storing the HMAC key. The MK, however, is retained at step 206 and stored on the HSM 108.

At step 216, the key manager circuit 128 digitally signs and encrypts the cryptogram. In other embodiments, the key manager circuit 128 may signcrypt the cryptogram. At step 218, the key manager circuit 128 transmits the cryptogram to the database server 112 via the secure connection 124. At step 220, the key manager circuit 128 directs the HSM 108 to store the MK, in the cleartext format, in permanent (e.g., non-volatile) memory, such as the memory device 120 of the HSM 108. In some embodiments, the MK may be encrypted by the key manager circuit 128 and stored encrypted outside the HSM 108. At step 222, the HSM 108 destroys the cryptogram to reduce security vulnerabilities associated with storing the cryptogram.

At step 224, the key manager circuit 144 of the database server 112 verifies the digital signature of the digitally signed and encrypted cryptogram. At step 226, the database server 112 stores the cryptogram to the memory device 152. In embodiments where the database server 112 is part of an electronic device, such as a mobile device or an IoT device, the cryptogram is stored in permanent memory of the electronic device. At step 228, the key manager circuit 128 of the database server 112 generates the ID. At step 230, the database server 112 stores the ID in the memory device 152 of the database server 112.

At step 232, the wallet formation circuit 132 generates the DK. At step 234, the HSM 108 requests the ID and the cryptogram from the database server 112. At step 236, the key manager circuit 144 retrieves the cryptogram from the memory device 152. At step 238, the key manager circuit 144 retrieves the ID from the memory device 152. At step 240, the key manager circuit 144 retrieves the certificate from the HSM 108 from the memory device 152. At step 242, the key manager circuit 144 digitally signs and encrypts the ID and the cryptogram. In other embodiments, the key manager circuit 144 can signcrypt the ID and the cryptogram. At step 244, the key manager circuit 144 transmits the digitally signed and encrypted ID and cryptogram to the HSM 108 over the secure connection 124.

At step 246, the HSM 108 verifies the digital signature of the cryptogram. At step 248, the wallet formation circuit 132 decrypts the cryptogram using the MK to regenerate the HMAC key. At step 250, the seed is generated by the wallet formation circuit 132 using the HMAC key and the ID. The seed is generated by calling an HMAC function, the executable file for which may be, for example, installed on the HSM 108. In some embodiments, the HMAC function may be a SHA-512 or a SHA-2 mechanism. At optional step 252, in some embodiments, the wallet formation circuit 132 generates a salt and adds the salt to the seed. In some embodiments, the wallet formation circuit 132 inputs the salt and the seed into a one-way hash function. In some embodiments, the wallet password is the seed. In some embodiments, the wallet password is the output of the one-way hash of the seed and the salt. At step 254, the wallet formation circuit 132 of the HSM 108 generates the digital wallet 104 with the DK and the wallet password. The wallet formation circuit 132 may generate the digital wallet 104 according to the PKCS #12 protocol. At step 256, the wallet formation circuit 132 stores the DK in the digital wallet 104. In some embodiments, the cleartext DK is stored in the digital wallet 104. In other embodiments, the DK is encrypted and/or obfuscated before it is stored in the digital wallet 104. At step 258, the wallet formation circuit 132 uses the wallet password to lock the digital wallet 104 such that the digital wallet 104 can only be unlocked using the wallet password. In some embodiments, the wallet formation circuit 132 uses the PKCS #5 protocol to lock the digital wallet 104. At step 260, the wallet formation circuit 132 digitally signs and encrypts the digital wallet 104. At step 262, the HSM 108 transmits the digital wallet 104 to the database server 112 over the secure connection. At step 264, the HSM 108 destroys the DK, the wallet password, the cryptogram, and the ID to reduce security vulnerabilities associated with permanently storing the DK, the wallet password, and the ID.

At step 268, the database server 112 receives the digital wallet 104. At step 270, the wallet management circuit 148 verifies the digital signature of the digital wallet 104. In embodiments in which the digital wallet 104 is encrypted, the wallet management circuit 148 decrypts the digital wallet. At step 272, the wallet management circuit 148 saves the digital wallet 104 to the memory device 152. Transmitting the digital wallet 104 without the wallet password prevents an unauthorized entity from gaining access to the DK if the digital wallet 104 is intercepted. Furthermore, the wallet password is not stored on the database server 112. Thus, even if the database server 112 is compromised, an unauthorized entity cannot unlock the digital wallet 104 to gain access to the DK.

Figure 3:
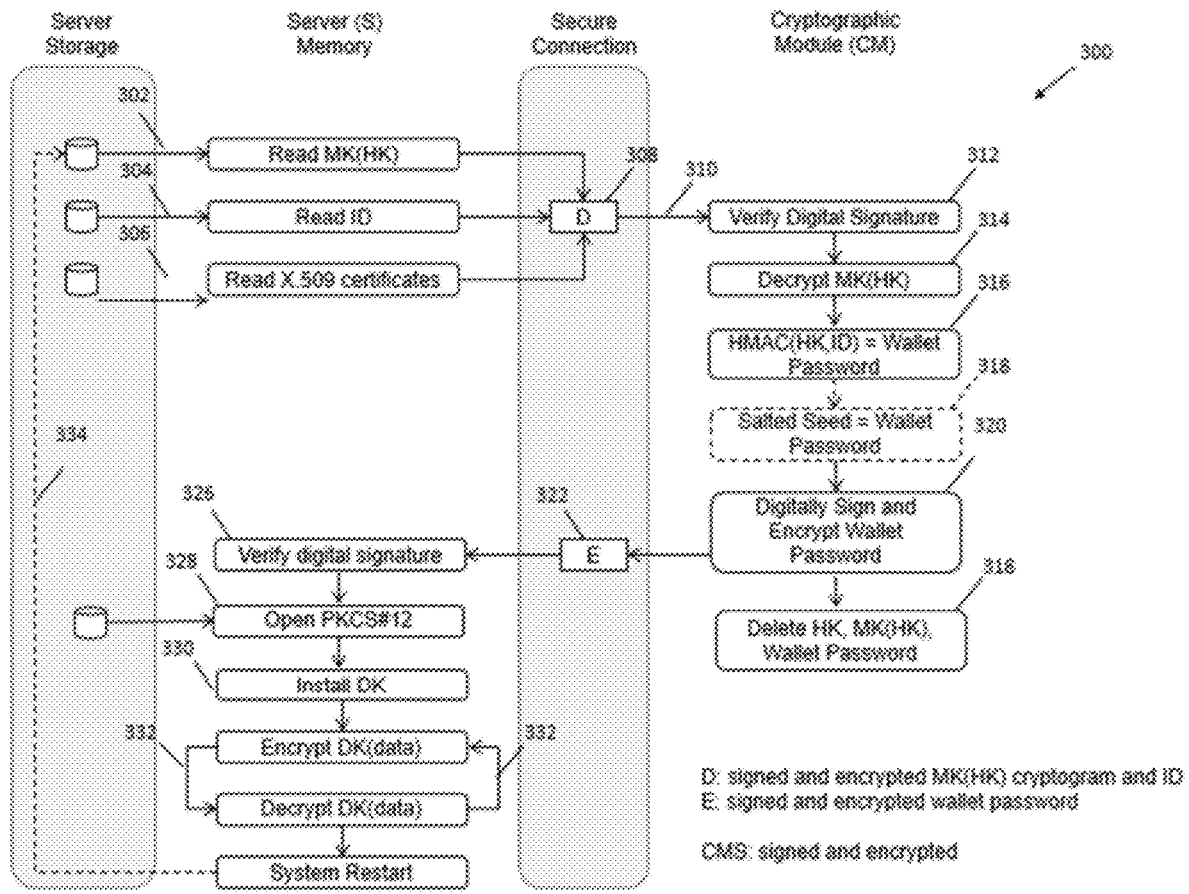
FIG. 3 is a schematic flow diagram of a method of regenerating the wallet password and using the regenerated wallet password to unlock the digital wallet without requiring a human operator to input the wallet password, according to an example embodiment.

Referring now to FIG. 3, a method 300 of regenerating the wallet password and using the regenerated wallet password to unlock the digital wallet 104 without requiring a human operator to input the wallet password is shown, according to an example embodiment. The database server 112 has started or restarted. Since the volatile memory of the database server 112 is erased when the database server 112 starts or restarts, the database server 112 cannot unlock the digital wallet 104 to access the cleartext DK. The database server 112 is in communication with the HSM 108 over the secure connection 124. At step 302, the database server 112 retrieves the cryptogram from the memory device 152. At step 304, the wallet management circuit 148 retrieves the ID from the memory device 152. At step 306, the wallet management circuit 148 reads the keys from the certificate. At step 308, the wallet management circuit 148 generates the password request message including the ID and the cryptogram. In some embodiments, the wallet management circuit 148 digitally signs and encrypts the password request message. In some embodiments, the wallet management circuit 148 signcrypts the password request message. At step 310, the wallet management circuit 148 of the database server 112 transmits the wallet password request message to the HSM 108 over the secure connection 124. At step 312, the key manager circuit 128 of the HSM 108 verifies the digital signature the password request message. The key manager circuit 128 decrypts the password request message. At step 314, the key manager circuit 128 uses the MK to decrypt the cryptogram to regenerate the HMAC key. At step 316, the wallet access circuit 136 regenerates the seed based on the ID and the HMAC key. The wallet access circuit 136 regenerates the seed by calling an HMAC function, the executable file for which may be, for example, installed on the HSM 108. In some embodiments, at optional step 318, the wallet access circuit 136 generates a salt and attaches the salt to the seed to generate the salted seed. The wallet access circuit 136 then inputs the salt and the seed to a one-way hash function. In some embodiments, the seed is the wallet password. In other embodiments, the output of the one-way hash of the salted seed is the wallet password. At step 320, the wallet access circuit 136 digitally signs and encrypts the wallet password. In other embodiments, the wallet access circuit 136 may signcrypt the wallet password. At step 322, the HSM 108 transmits the digitally signed and encrypted wallet password to the database server 112 over the secure connection 124. At step 324, the wallet access circuit 136 destroys the cryptogram, the HMAC key, the seed, and the optional salt.

At step 326, the wallet management circuit 148 verifies the digital signature of the wallet password and decrypts the wallet password. At step 328, the wallet management circuit 148 uses the wallet password to unlock the digital wallet 104 to access the cleartext DK. At step 330, the wallet management circuit 148 reads the DK into the volatile memory of the database server 112. At step 332, the data processed on the database server 112 is encrypted and decrypted using the DK. At step 334, the wallet management circuit 148 destroys the wallet password.

Advantageously, the DK is not stored in the memory device 152 associated with the database server 112. As described above, the method 300 does not require human entry of the wallet password to unlock the digital wallet 104.

Although the system 100 and the methods 200 and 300 do not require a human operator to enter the wallet password into the database server 112 to enable the database server 112 to unlock the digital wallet 104, in some embodiments it may be desired to generate a human-readable data that can be entered into the database server 112 by a human operator using a human-machine interface 160. The human-readable data can be used to regenerate the wallet password. In such an embodiment, the wallet formation circuit 132 can be structured to translate the wallet password to a human-readable string of characters that can be input to the database server 112 via a human-machine interface 160. The wallet formation circuit 132 can be structured to generate a plurality of components of the wallet password according to a N of N scheme or a plurality of shares of the wallet password according to a N of M scheme. The wallet formation circuit 132 can be structured to digitally sign and encrypt each of the components or each of the shares of the wallet password. Each of the digitally signed and encrypted components or shares can be human-readable such that the digitally signed and encrypted components or shares can be entered via the human-machine interface 160. The wallet formation circuit 132 can be structured to write the components or the splits to a share-holder. In some embodiments, the share-holder can include storage media such as paper, smart cards, or USB sticks that are provided to human operators.

In embodiments in which the wallet password can be regenerated based on data that can be entered by a human operator, the database server 112 includes a human-machine interface 160. The wallet management circuit 148 can be configured to receive the wallet password from the human-machine interface 160. The wallet management circuit 148 can be structured to combine the components or the shares to regenerate the wallet password.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § X(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
generating a cryptogram by encrypting, by a hardware security module (HSM), a keyed-hash message authentication code (HMAC) key by a master key encryption key (MK);
transmitting, by the HSM to a database server, the cryptogram;
destroying, by the HSM, the cryptogram at the HSM, in response to the transmitting the cryptogram to the database server;
receiving, by the HSM from the database server, the cryptogram and an identifier (ID) generated by the database server;
generating, by the HSM, a wallet password based on the ID and the received cryptogram;
generating, by the HSM, a digital wallet comprising a data encryption key (DK) retrievable only via the wallet password;
transmitting, by the HSM to the database server, the digital wallet comprising the DK without the wallet password;
destroying, by the HSM, the wallet password in response to the transmitting the DK to the database server;
decrypting, by the HSM, the received cryptogram into a decrypted HMAC key;
regenerating, by the HSM, the wallet password using the ID and the decrypted HMAC key;
encrypting, by the HSM, the regenerated wallet password; and
transmitting, by the HSM to the database server, the encrypted regenerated wallet password,
wherein the database server is configured to decrypt the encrypted regenerated wallet password, and retrieve the DK from the digital wallet using the decrypted regenerated wallet password.

2. The method of claim 1, further comprising:
digitally signing, by the HSM, the regenerated wallet password; and
transmitting, by the HSM to the database server, the digitally signed and encrypted regenerated wallet password.

3. The method of claim 1, further comprising:
receiving, by the HSM from the database server, a password request message including the ID and the cryptogram.

4. The method of claim 1, wherein the HSM retains the MK and the database server retains the cryptogram.

5. The method of claim 1, further comprising:
adding, by the HSM, a salt value to the encrypted regenerated wallet password.

6. The method of claim 1, further comprising:
generating, by the HSM, the salt value.

7. A system, comprising:
a database server; and
a hardware security module (HSM);
wherein the HSM is structured to:
generate a cryptogram by encrypting a keyed-hash message authentication code (HMAC) key by a master key encryption key (MK);
transmit, to a database server, the cryptogram;
destroy the cryptogram at the HSM, in response to the transmitting the cryptogram to the database server;
receive, from the database server, a password request message comprising the cryptogram and an identifier (ID) generated by the database server;
generate a wallet password based on the ID and the received cryptogram;
generate a digital wallet comprising a data encryption key (DK) retrievable only via the wallet password;
transmit, to the database server, the digital wallet comprising the DK without the wallet password;
destroy the wallet password in response to the transmitting the DK to the database server;

decrypt the received cryptogram into a decrypted HMAC key;
regenerate the wallet password using the ID and the decrypted HMAC key;
encrypt the regenerated wallet password; and
transmit, to the database server, the encrypted regenerated wallet password; and
wherein the database server is structured to:
decrypt the encrypted regenerated wallet password; and
retrieve the DK from the digital wallet using the decrypted regenerated wallet password.

8. The system of claim 1, the HSM further structured to:
digitally sign the regenerated wallet password; and
transmit, to the database server, the digitally signed and encrypted regenerated wallet password.

9. The system of claim 1, the HSM further structured to:
receive, from the database server, a password request message including the ID and the cryptogram.

10. The system of claim 1, wherein the HSM retains the MK and the database server retains the cryptogram.

11. The system of claim 1, the HSM further structured to:
adding a salt value to the encrypted regenerated wallet password.

12. The system of claim 1, the HSM further structured to:
generate the salt value.

13. A method, comprising:
generating, by a database server including a digital wallet comprising a data encryption key (DK) and locked with a wallet password, a password request message including a cryptogram generated by a hardware security module (HSM) and an identifier (ID) generated by the database server, the cryptogram generated by encrypting, by the HSM, a keyed-hash message authentication code (HMAC) key by a master key encryption key (MK);
encrypting, by the database server, the password request message;
transmitting, by the database server, the password request message to the HSM over a secure connection;
receiving, by the database server, an encrypted regenerated wallet password from the HSM;
verifying, by the database server, a digital signature of the encrypted regenerated wallet password;
generating, by the database server, a regenerated wallet password by decrypting, by the database server, the encrypted regenerated wallet password;
unlocking, by the database server, the digital wallet using the regenerated wallet password,
wherein the HSM is configured to receive the password request message, verify the digital signature of the password request message, decrypt the password request message, regenerate the wallet password based on the received cryptogram and the ID, digitally sign and encrypt the regenerated wallet password, and transmit the digitally signed and encrypted wallet password to the database server.

14. The method of claim 13, further comprising:
transmitting, by the database server after a system restart, a second password request message to the HSM to receive the regenerated wallet password.

15. The method of claim 13, further comprising:
digitally signing, by the database server, the password request message.

16. The method of claim 15, further comprising:
verifying, by the database server, the digital signature of the digitally signed and encrypted regenerated wallet password.

17. The method of claim 13, wherein the wallet password is a seed of a database encryption wallet (DBEW) scheme.

18. The method of claim 17, wherein the seed is based on a SHA mechanism.

* * * * *